April 6, 1937. J. R. NOLAN 2,075,826
MACHINE FOR ATTACHING WIRES TO FLORAL STICKS OR THE LIKE
Filed March 16, 1935 7 Sheets-Sheet 1

Inventor
John R. Nolan

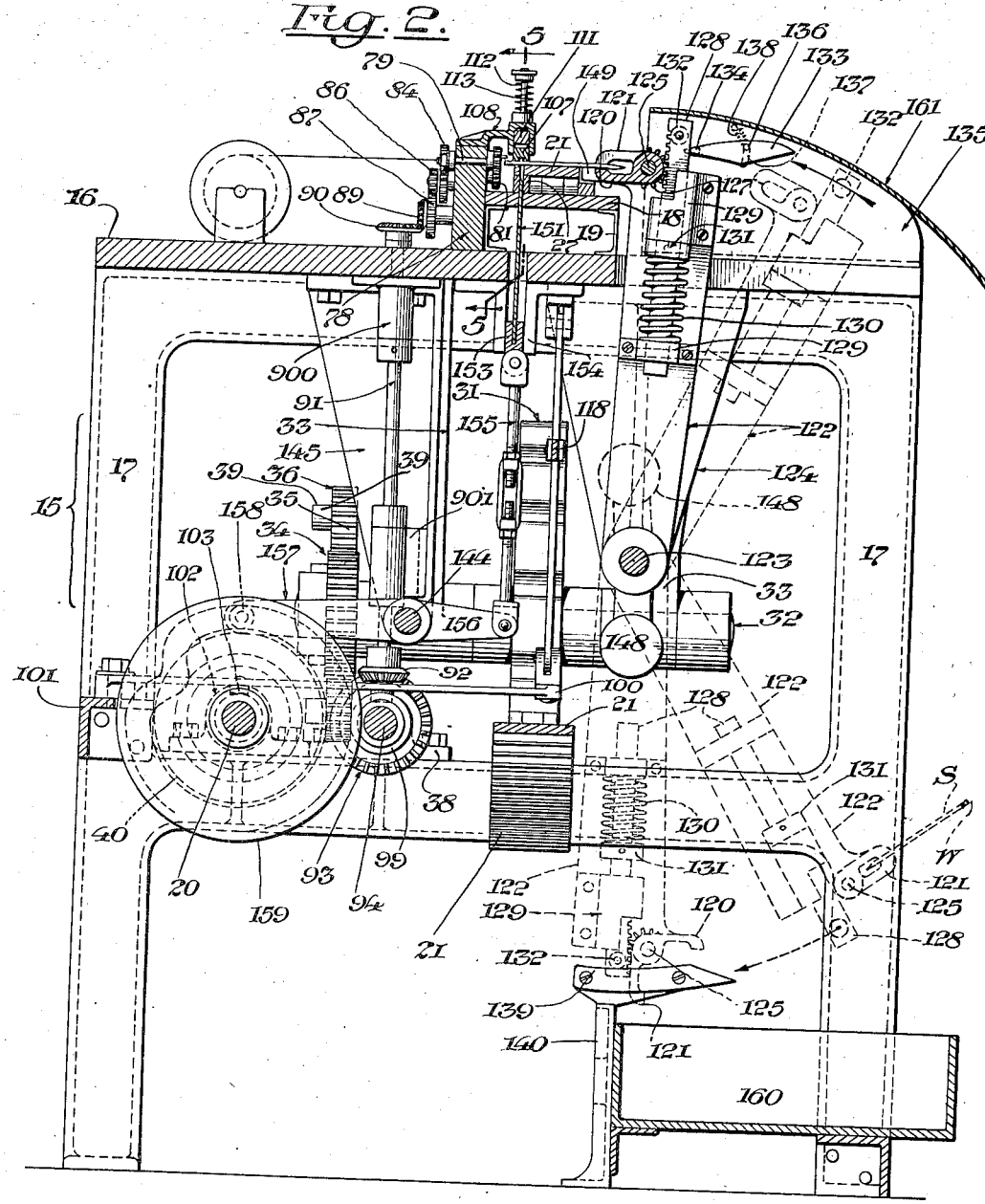

April 6, 1937.  J. R. NOLAN  2,075,826
MACHINE FOR ATTACHING WIRES TO FLORAL STICKS OR THE LIKE
Filed March 16, 1935  7 Sheets-Sheet 3
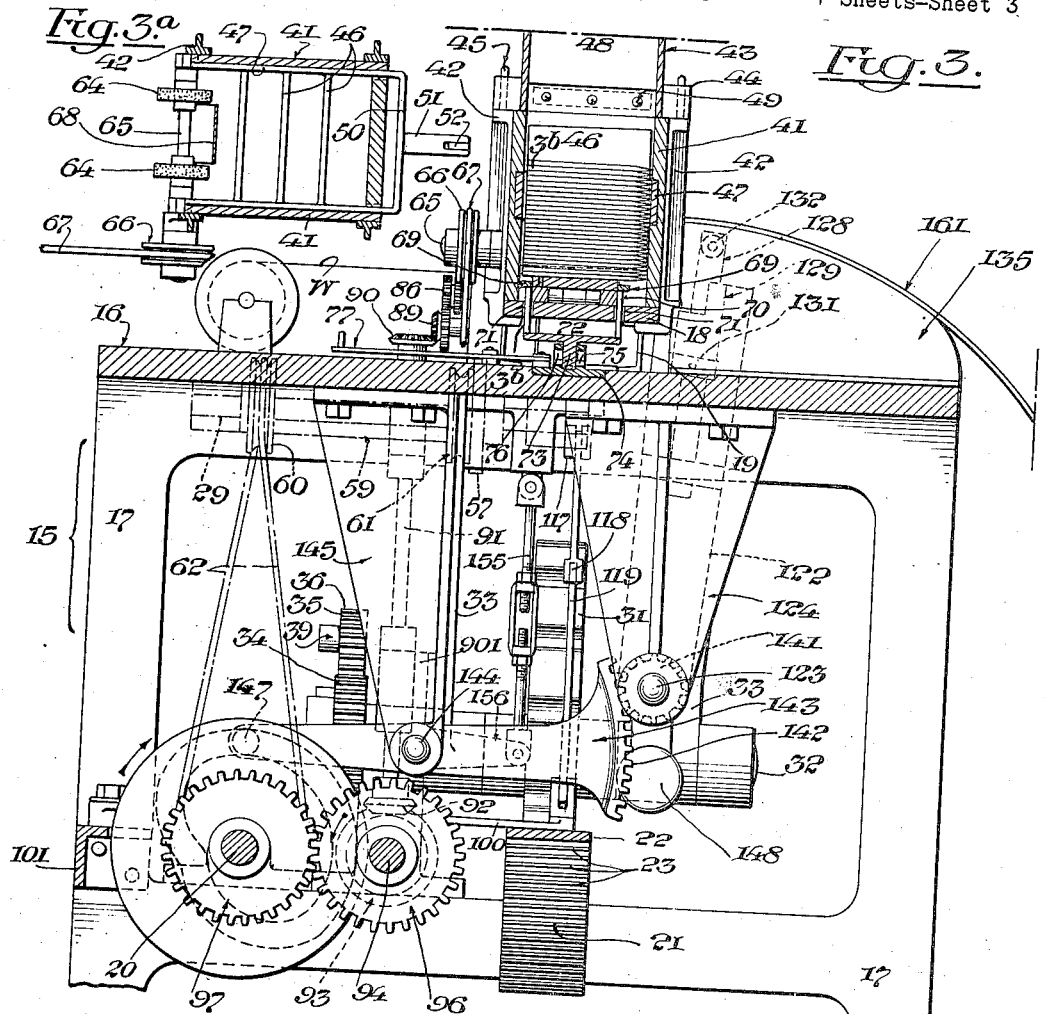
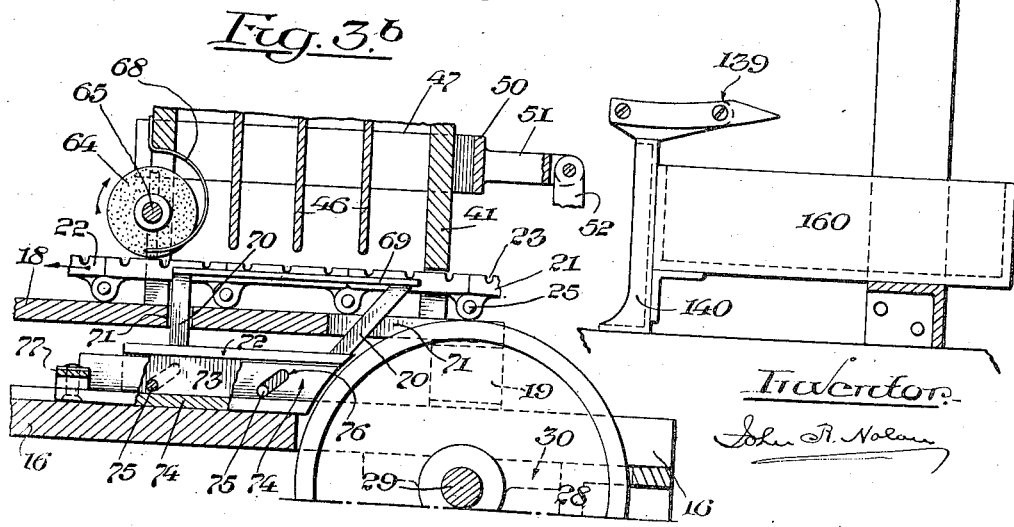
Inventor
John R. Nolan April 6, 1937.　　　　　J. R. NOLAN　　　　　2,075,826
MACHINE FOR ATTACHING WIRES TO FLORAL STICKS OR THE LIKE
Filed March 16, 1935　　　7 Sheets-Sheet 4

Inventor
John R. Nolan

April 6, 1937.  J. R. NOLAN  2,075,826
MACHINE FOR ATTACHING WIRES TO FLORAL STICKS OR THE LIKE
Filed March 16, 1935  7 Sheets-Sheet 6
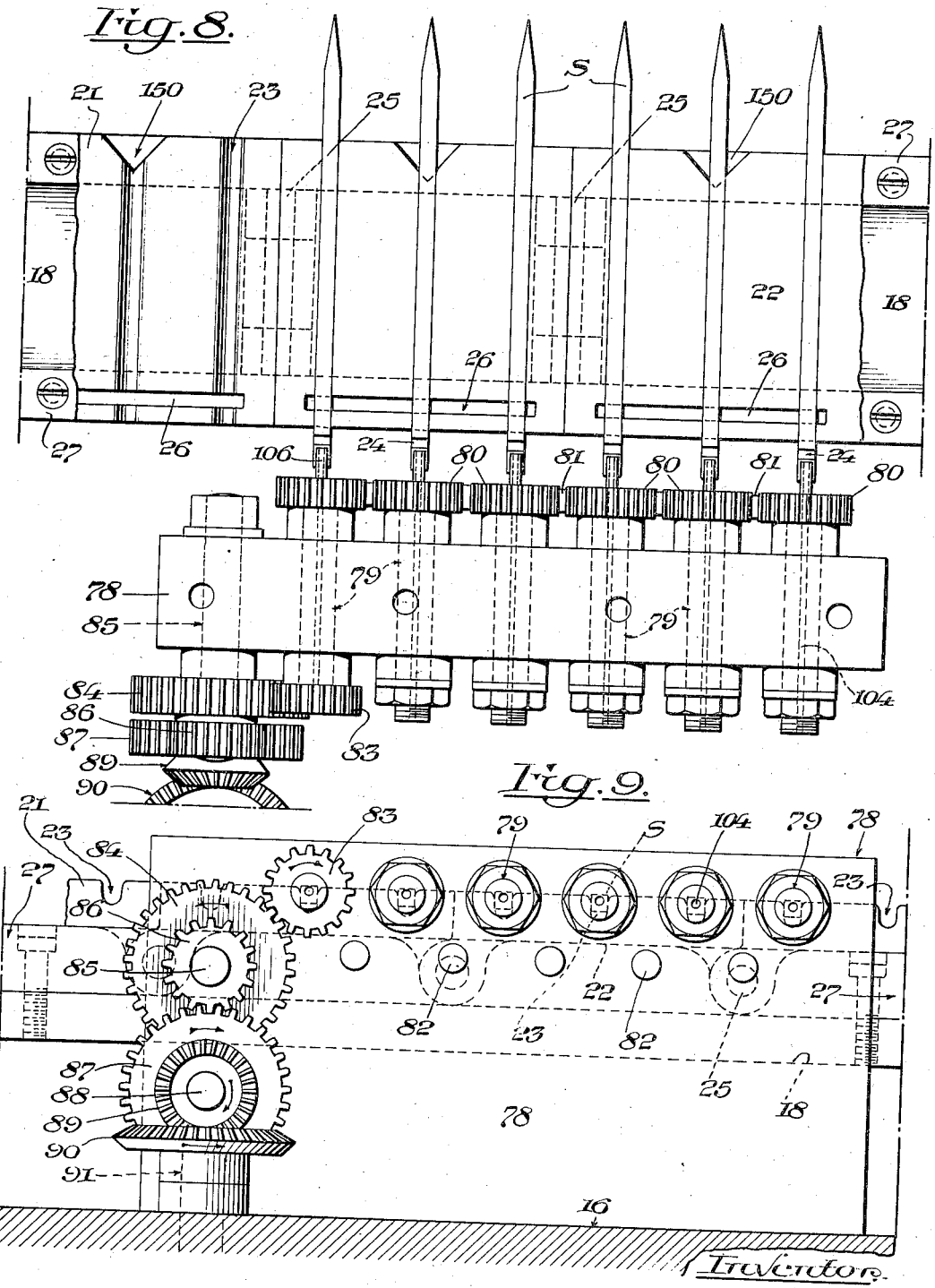

April 6, 1937.   J. R. NOLAN   2,075,826
MACHINE FOR ATTACHING WIRES TO FLORAL STICKS OR THE LIKE
Filed March 16, 1935   7 Sheets-Sheet 7
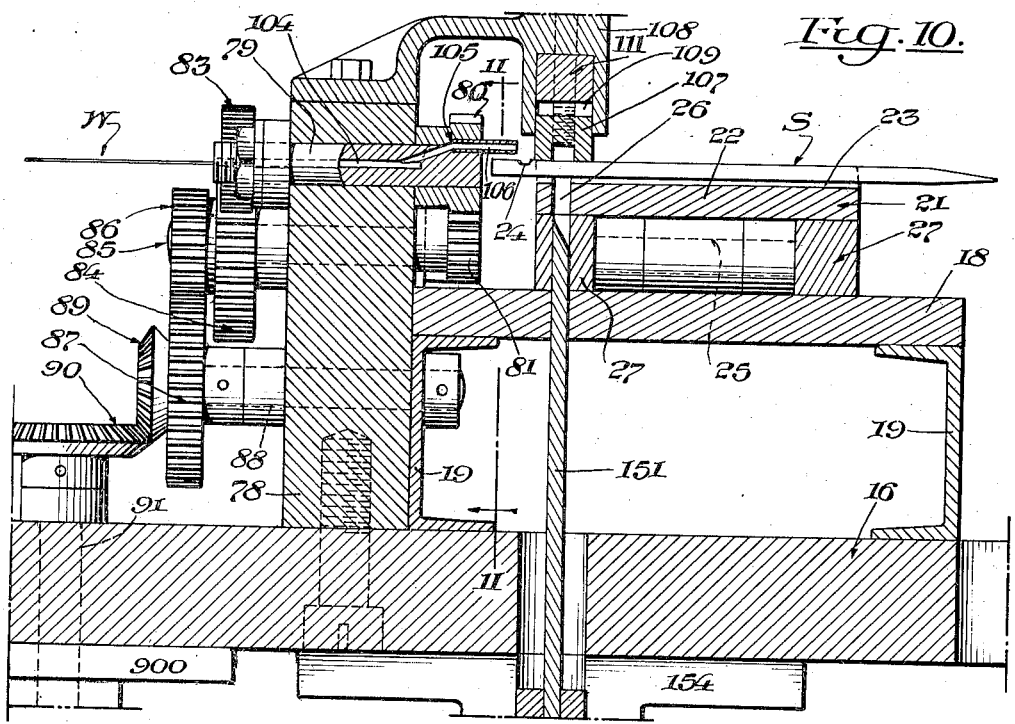
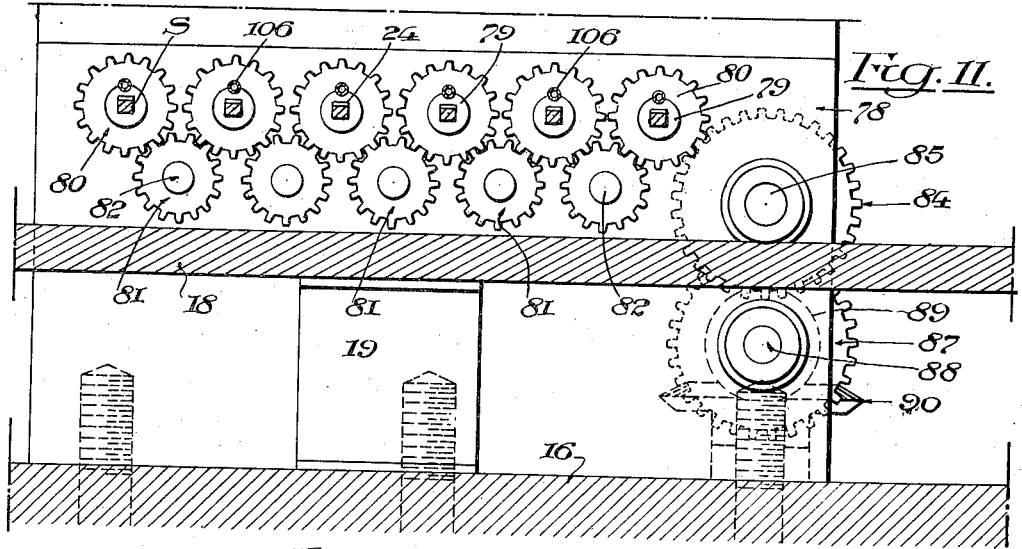
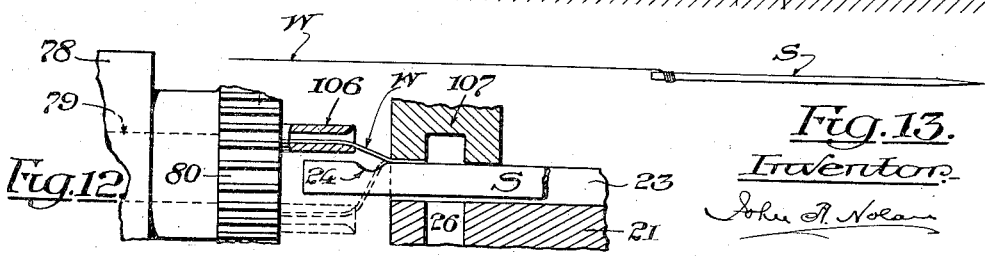

Patented Apr. 6, 1937

2,075,826

UNITED STATES PATENT OFFICE 2,075,826

MACHINE FOR ATTACHING WIRES TO FLORAL STICKS OR THE LIKE

John R. Nolan, Larchmont, N. Y.

Application March 16, 1935, Serial No. 11,394

18 Claims. (Cl. 140—93)

This invention relates to a machine for attaching wires to slender sticks, more especially to so-called floral sticks that are applied to the stems of leaves and flowers in the fabrication of floral ornamentations and the like.

An object of my invention is to provide a machine embodying simple and efficient mechanism whereby the end of a wire is securely wound upon one end of a stick.

Another object is to provide such a machine whereby the wire thus wound on the stick is drawn a suitable distance from a reel or other source of supply, and a measured length then cut from the body of the wire to coil about stems of leaves and flowers to which the sticks are to be attached.

Another object is to provide such a machine whereby a plurality of sticks are simultaneously provided with individual wires all wound in the same direction.

With these and other objects in view my invention comprises novel features of construction and principles of operation, which, in a preferred embodiment of the invention, will be hereinafter described; the scope of the invention being expressed in the appended claims.

In the drawings—

Fig. 2 is a transverse vertical section of the machine in a plane through the wire winding mechanism, as on the line 2—2 of Fig. 1.

Fig. 3 is a similar section in a plane through the stick supply hopper, as on the line 3—3 of Fig. 1.

Figure 1:
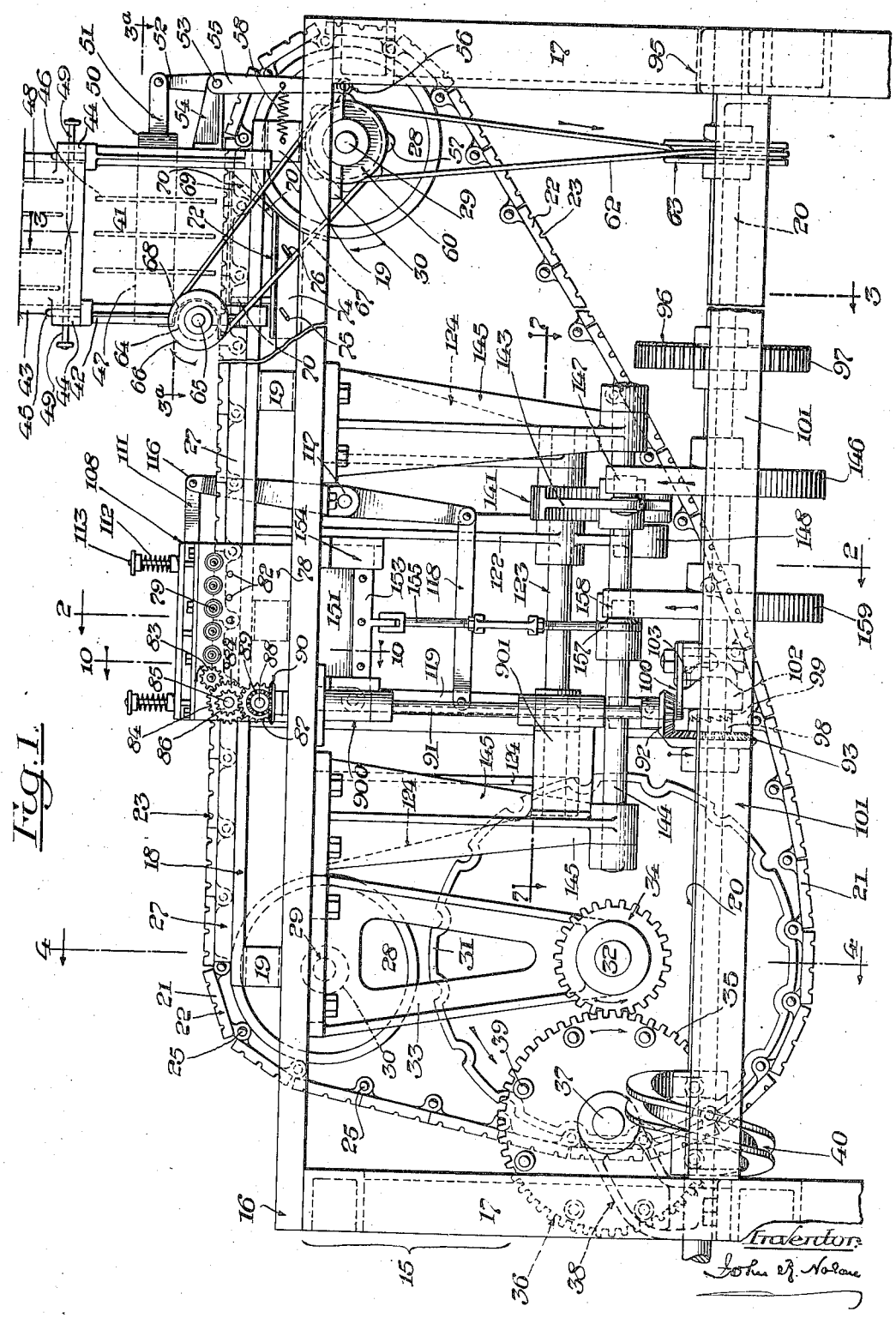
Figure 1 is a side elevation of a machine embodying the principle of my invention.

Fig. 3ª is a horizontal section through the delivery portion of the stick hopper, as on the line 3ª—3ª of Fig. 1.

Fig. 3ᵇ is a longitudinal vertical section through the lower portion of the hopper and adjuncts, as on the line 3ᵇ—3ᵇ of Fig. 3.

Figure 4:
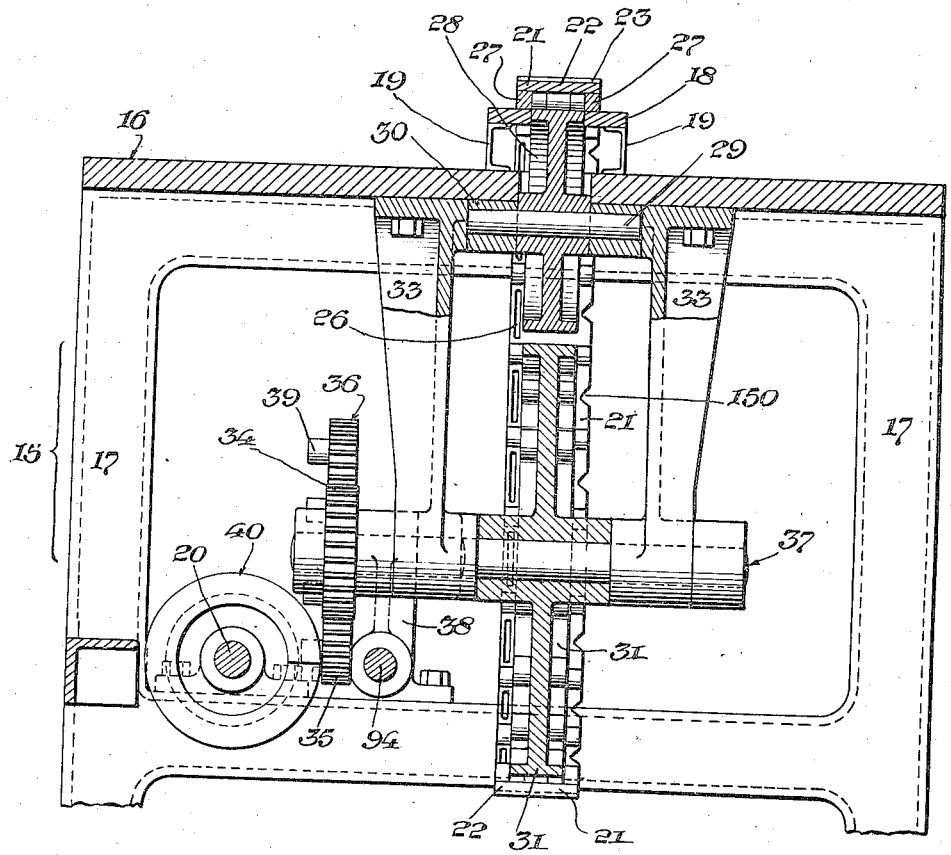

Fig. 4 is a similar section in a plane through the carrier driving mechanism, as on the line 4—4 of Fig. 1.

Figure 5:
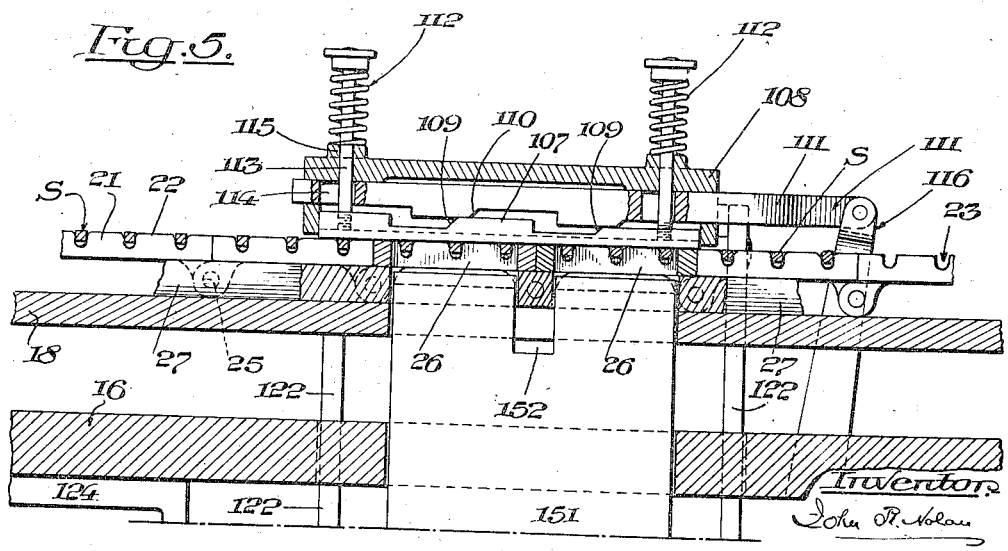

Fig. 5 is a longitudinal vertical section in a plane through the wire-end clamp, as on the line 5—5 of Fig. 2.

Figure 6:
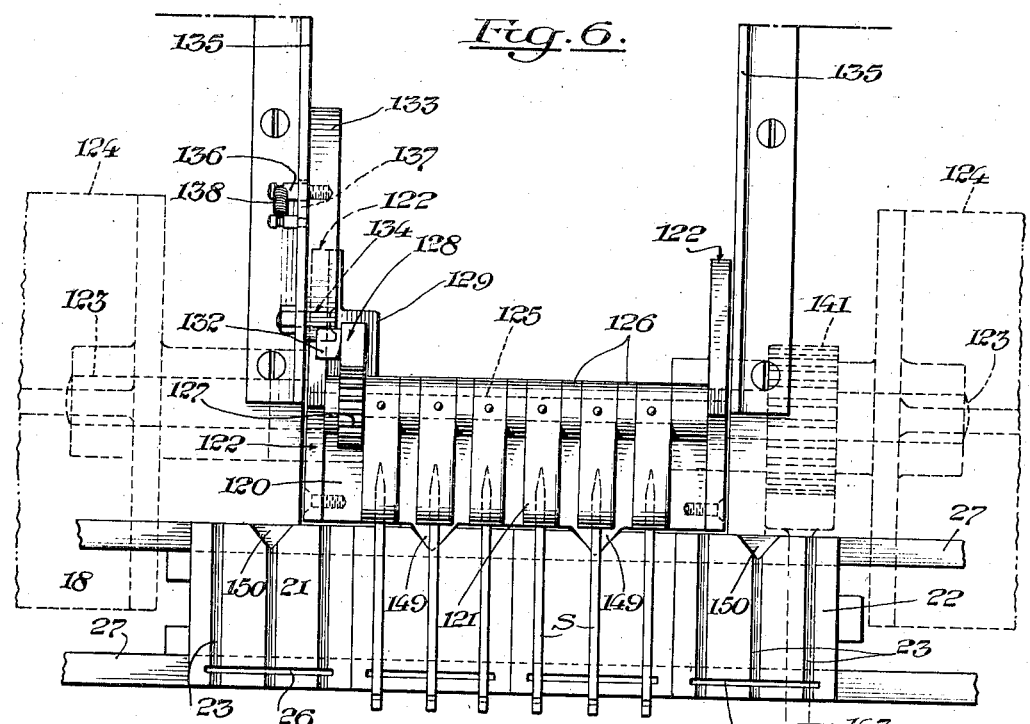

Fig. 6 is a partial plan, showing the stick gripper and adjuncts.

Figure 7:
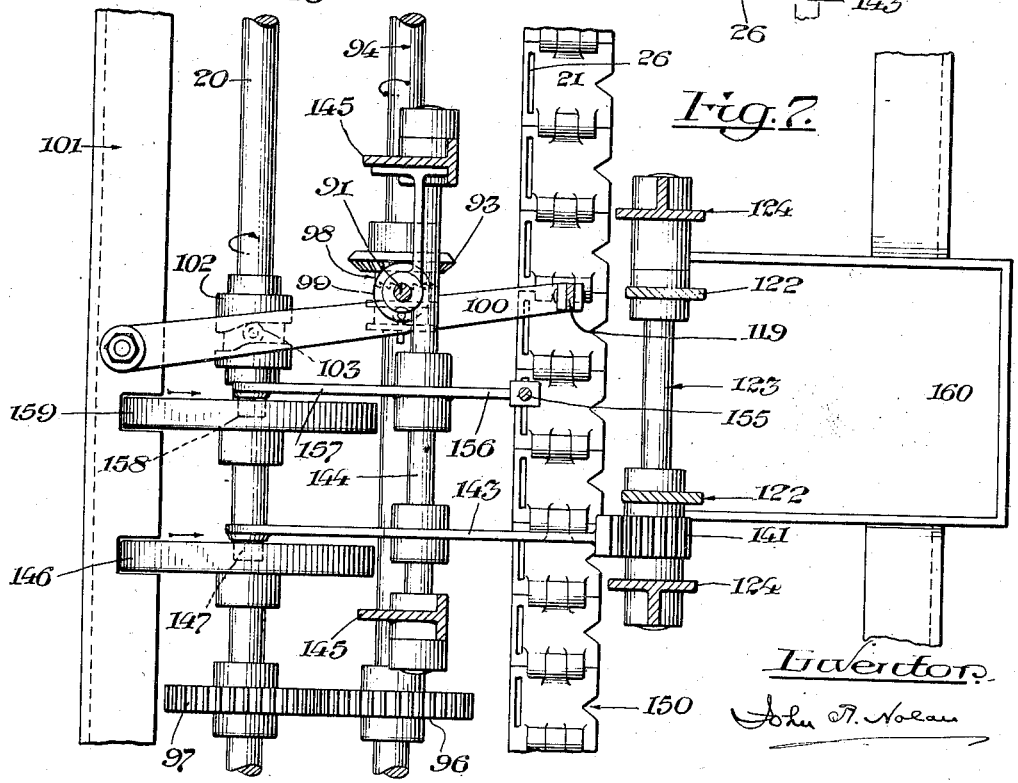

Fig. 7 is a horizontal section of a portion of the machine showing the co-operating elements for actuating the wire winders, the wire-end clamp, and the gripper supporting frame.

Fig. 8 is a plan of the wire-winding mechanism and a portion of the stick carrier as supplied with sticks in co-operative relation to the winders.

Fig. 9 is a front elevation of the mechanism shown in Fig. 8.

Fig. 10 is a transverse vertical section in a plane through the wire winding and clamping mechanisms, as on the line 10—10 of Fig. 1.

Fig. 11 is a longitudinal vertical section in a plane adjacent the winding gears, as on the line 11—11 of Fig. 10.

Fig. 12 is a sectional detail of one of the wire winders and the adjacent clamp, together with a portion of the stick carrier.

Fig. 13 represents a wired floral stick.

Referring to the drawings, 15 designates a suitable supporting frame comprising a table 16; standards 17 therefor, and a relatively narrow bed 18 supported above and longitudinally of the table by members 19 rising from the table.

20 designates a drive shaft extending longitudinally of and beneath the table and having its bearings in the standards 17.

21 designates a stick feeding and supporting element embodying, in the present instance, a flexible carrier composed of an endless chain of links. Each link comprises a rectangular body 22 having in its outer flat surface a series of equally spaced transverse grooves 23 which afford parallel holders for individual sticks S with their ends projecting beyond the respective sides of the link. The sticks are usually formed from veneer and are of square cross-section, one end of each stick being blunt and the other end pointed, as shown. These sticks are made of various sizes to meet particular requirements, the relatively large sizes being sometimes provided adjacent the blunt end with a recess, as 24, adapted to receive the wound portion of the wire.

The succeeding links of the chain or stick carrier 21, are pivotally connected at their ends, as at 25, and the adjacent end grooves of the adjoining links are spaced correspondingly with the remaining grooves of the respective links. Each of the links has a slot 26 extending longitudinally thereof and in communication with the grooves 23 adjacent the front of the link. The purpose of the slot will presently appear.

The upper run of the chain is supported on the bed 18 between spaced parallel guide bars 27 on the bed, while the lower run of the chain travels beneath the table. The chain passes about pulleys 28 loose on stationary shafts 29 supported in brackets 30 adjacent the respective ends of the table, and such chain is also flexed about a lower sprocket wheel 31 which is fast on a transverse shaft 32 journaled in suitable hangers 33 supported at the left of the table, as viewed in Fig. 1. The shaft 32 has fast thereon a gear 34 in mesh with the peripheral gear face 35 of a pinwheel 36 fast on a shaft 37 parallel with the shaft 32, which shaft 37 is journaled in bearing brackets 38 on the adjacent end standard 17. The pins 39 of the wheel 36 mesh with a worm cam 40 fast on the drive shaft. The contour of the cam and the ratio of the gears 34 and 35 are such that in one half rotation of the cam the chain is impelled a distance equal to the length of two adjoining links, while in the other half rotation of the cam the chain is temporarily locked; and so on the chain is intermittently impelled during each complete rotation of the cam. Any other suitable motion transmission mechanism for the chain may be employed.

At the right of the bed 18 suitable means for supplying sticks to the grooves of the carrier chain is provided, which means in the form selected for illustration comprises a vertical stick containing hopper overhanging the chain of links. The sticks contained in the hopper lie transversely of the path of the upper run of the chain so that in the travel of the latter each of the individual grooves of the succeeding links passing beneath the hopper is supplied with a single stick.

The hopper embodies a stationary base section 41 which is supported directly over and adjacent the chain by suitably-disposed brackets 42 on the bed, and also an upper supply section 43 having corner pieces 44 which are detachably fitted on upstanding pins 45 on the brackets 42. The base section is provided with a series of spaced vertical partition walls 46 which are supported by and between slide plates 47 which are mounted in guideways in the inner side walls of the section 41, so as to have capacity for vibratory motion of small amplitude and high frequency longitudinally of the carrier chain. The upper section 43 is provided with fixed transverse partitions 48 in staggered relation to the lower partitions 46, which upper and lower partitions afford in the respective sections parallel transverse chambers of less width than the length of a stick, thus obviating undue lateral disarrangement of the contained sticks in their downward passage through the hopper to the chain. The descent of the sticks is efficiently contributed to by the jarring effects imparted thereto by the rapidly vibrating partitions 46.

The upper section 43 is provided with a suitable bottom gate comprising, in the present instance, oppositely movable rods 49 slidable transversely of the sticks, which rods when such section is detached from the base section, can be moved inwardly to provide a skeleton gate effective to prevent the escape of the sticks when the section 43 is supplied therewith. The section thus filled with sticks is applied to the pins 45 at the top of the base section, and the gate rods are then withdrawn, thus permitting the superposed sticks within the section 43 to descend and enter the base section in an orderly manner.

As a means for vibrating the partitions of the base section the outer ends of the slide plates 47 are connected by a cross-bar 50 having a central extension 51, which, in turn, is connected to an upstanding arm 52 on a rocker-shaft 53 having its bearings in brackets 54 on the base section 41. The shaft 53 is provided at one end with a depending arm 55 having a roll 56 which is held resiliently in contact with the fluted periphery of a cam 57 by means of a spring 58 connecting the arm 55 to the adjacent fixed member 19 on the table. The cam 57 is secured to one end of an elongated hub 59 loose on the shaft 29, which hub has fast thereon two spaced sheaves 60 and 61. The sheave 60 is connected by means of a belt 62 with a sheave 63 fast on the drive shaft 20. Hence during the rotation of the latter shaft the cam 57 is rotated and the rocker shaft 53 perforce rapidly vibrated by the opposing actions of the cam 57 and the spring 58, thus rapidly vibrating the partitions 46 and ensuring the orderly delivery of the sticks toward and upon the links of the carrier chain and their efficient entry in the grooves of the latter.

The hopper is so arranged in respect to the path of the chain that the ends of the sticks imposed on the chain links project beyond the respective sides of each link, the blunt ends of the sticks being disposed at the front or near side of the link, as shown.

At the exit wall of the base section of the hopper are spaced feed rolls 64 of rubber or other yielding material which lie partially within the hopper and in close proximity to the carrier chain. The rolls are mounted on a transverse shaft 65 having its bearings in the front and rear walls of the base section. One end of the shaft 65 has a sheave 66 which is operatively connected by means of a belt 67 with the sheave 61. The rotating rolls bear against the opposing sticks in the travelling chain thereby tending to seat each individual stick uniformly in its groove; that is to say, if the sticks as they pass from the hopper are properly seated in the grooves of the chain the rolls will bear upon the opposing flat upper surfaces of the sticks, but should any stick be canted in its groove then the leading inclined lateral surface of the canted stick will impinge against the opposing surfaces of the rolls 64 with the result that the stick will be partially turned about its longitudinal axis and properly seated in its groove as it progresses under the rolls. The exit wall of the base hopper section is preferably provided with depending inwardly extending curved members 68 which are positioned between the rolls and slightly above the carrier chain so as to obviate liability of the jamming against the rolls of the sticks within the hopper.

In order to suspend the delivery of the sticks by the hopper to the carrier chain during the operation of the latter, as occasion may require, (for example, at the end of a working period when it may be desired to limit the wiring operation to the sticks seated on the chain in the space between the hopper and the wire winding devices), means are provided whereby the sticks contained in the hopper can be readily raised and temporarily held above the path of the chain. The means shown comprises a pair of spaced parallel rails 69 which are arranged directly under the sticks contained in the hopper and in adjacence to the respective sides of the chain, and which rails are supported by a vertically movable frame having posts 70 slidably mounted in guideways 71 in the bed 18.

The body 72 of the frame has a longitudinal medial rib 73 which is seated in a longitudinally grooved bar 74 slidably mounted on the table 15. The rib has spaced transverse pins 75 which pass freely through diagonally-disposed slots 76 in the bar 74. Hence when the bar 74 is longitudinally reciprocated the walls of the slots co-act with the pins in a manner to raise and lower the frame.

One side of the bar 74 is pivotally jointed to the inner arm of a lever 77 which is fulcrumed on the table 16, the other arm of the lever having a suitable handle to facilitate its manual operation and effect the reciprocation of the bar. The angularity of the slots 76 is such that when the handle bar is pulled outward a limited distance, the frame and its rails 69 are raised, thus elevating the mass of overlying sticks above the path of the travelling carrier chain, and when such bar is pushed inward the frame and rails are returned to their previous position below the grooved surface of the carrier chain, thus permitting the sticks to settle on the latter.

Located on the table 16 a suitable distance from the hopper, adjacent the front of the upper run of the chain, is a bearing block 78 in which are journaled the shafts 79 of a series of wire winding gears 80 which are successively spaced apart in a row equal in length to that of two adjoining links, so that in each step of the chain two links are positioned in operative relation to the respective gears 80.

The gears 80 mesh with idler gears 81 having their shafts 82 journaled in the bearing block 78 below and in alternation with the shafts of the winding gears, in order that the latter gears shall be simultaneously rotatable in the same direction, e. g., clockwise. Any other suitable gearing for actuating the winding gears 80 may be employed.

In the present instance the shaft 79 of the winding gear at one end of the series has fast thereon a gear 83 in mesh with a larger gear 84 on a shaft 85 which is also mounted in the bearing block.

The shaft 85 is provided adjacent the gear 84 with a pinion 86 with which meshes a gear 87 on a lower shaft 88 having a bevel pinion 89. The pinion 89 meshes with a bevel gear 90 on the upper end of a vertical shaft 91 which is journaled in suitable bearing members 900 and 901 supported respectively by the table and by one of a pair of hangers 145 hereinafter referred to. The lower end of the shaft 91 has fast thereon a bevel gear 92 in mesh with a similar gear 93 loose on a shaft 94 adjacent to and parallel with the drive shaft 20. The shaft 94 has its bearings in the bracket 38 and in a bracket 95 on the opposite end standard 17, and is provided with a gear 96 in mesh with a gear 97 on the drive shaft. The bevel gear 93 has a clutch member 98 with which co-acts a sliding complementary member 99 splined on the shaft 94 and adapted to be engaged or disengaged at predetermined intervals with or from the member 98 in order to render the gear 93 fast or loose on the shaft 94, as desired. The clutch member 99 is operatively connected to a lever 100 which overhangs the shafts 20 and 94, the forward end of such lever being fulcrumed on a side rail 101 at the front of the main frame. This lever 100 extends adjacent a peripherally grooved cam 102 fast on the drive shaft 20 and has a roll 103 which is operatively fitted in the race of the cam. The contour of the cam race is such that during a partial rotation of the drive shaft, while the carrier chain is at rest, the lever is actuated to clutch the gear 93 on the shaft 94, thereby effecting the rotation of the vertical shaft 91 and the transmission of motion therefrom to the shaft 85 through the system of gears previously described. Thus several rapid rotations, say, four or five, are imparted to each of the winding gears 80. Thereupon the lever 100 is actuated by the cam 102 to unclutch the bevel gear 93, and, in consequence, the shaft 91 and the transmission gears operated thereby remain quiescent until another step of the carrier chain has been completed and while the chain is at rest; and so on during each dwell of the intermittently moving chain the winding gears are rendered active and inactive.

The shaft 79 of each of the winding gears has an axial bore 104 terminating in an eccentric portion 105 at the inner end of the shaft. This eccentric portion is preferably provided with a short rearwardly projecting tube 106 which constitutes, in effect, a continuation of the bore. The free ends of the strands of wire W, extending from suitably-disposed spools or rolls, are threaded through the bores and tubes of the respective gear shafts 79 in such manner that the extremities of the wires overhang the adjacent blunt ends of the respective sticks which are positioned in the vicinity of the gears 80.

When in the intermittent travel of the carrier chain, two adjoining links thereof are positioned in operative relation to the series of winding gears, the sticks which are seated in the grooves of such links are in axial alignment with the respective gears 80, or substantially so; the projecting ends of the tubes 106 of such gears overhang the blunt ends of the sticks, and the extremities of the wires protrude from the tubes directly over such latter ends. At this juncture the extremities of the wires are clamped against the opposing sticks and the sticks thus firmly held in their grooves, whereupon, the winding gears are rapidly rotated, as previously mentioned, in order to turn the eccentric tubes several times around the proximate ends of the sticks, and, perforce, tightly wind the wires around the respective sticks adjacent the clamping means.

In the present instance the clamping means comprises a vertically-movable presser bar 107 which extends longitudinally of and overlies the adjoining chain links which are adjacent the series of winding gears. This bar is slidably mounted in a vertical guideway in a guide head 108 which overhangs the path of the chain and is conveniently supported by the bearing block 78.

The top of the presser bar 107 is formed with suitably beveled cam surfaces 109 with which co-act the complementary cam surfaces 110 of a longitudinally reciprocative bar 111 which extends slidably through and is guided in the ends of the head 108. In one stroke of the latter bar its cam surfaces co-act with the opposing surfaces of the presser bar in a manner to depress the presser bar against the action of suitably-disposed compression springs 112. These springs bear against the guide head and the heads of pins 113 which rise from the presser bar and extend freely through suitable openings 114 and 115 in the cam bar 111 and guide head respectively. In the reverse stroke of the cam bar the presser bar is released by the relative movement of the opposed cam surfaces, whereupon the springs 112 raise the presser bar sufficiently to unclamp the contiguous wire ends and sticks.

As illustrated one end of the cam bar 111 is extended beyond the adjacent end of the guide head 108 and is operatively connected to any suitable reciprocating mechanism. In the present instance the bar 111 is pivotally connected to the upper end of a vertical lever 116 which is fulcrumed on a bracket 117 depending from the table. The lower end of the lever 116 is coupled by means of a link 118 to a suspension link 119 for the rearward end of the clutch-actuating lever 100 thus partaking of the motion of the suspension link when the lever is actuated.

The co-operative relation of the elements just described is such that in the initial stroke of the lever 100 toward the clutch the lever 116 is actuated to effect through the movement of the cam bar 111 the efficient clamping of the presser bar upon the underlying wire ends which extend from the winder tubes; and as the stroke continues the clutch member 99 is engaged with the companion member 98 on the bevel gear 93, thus clutching the gear to the driven shaft 91 and effecting the rotation of the winding gears. In the initial back stroke of the lever 100, at the termination of the winding operation, the bevel gear 93 is unclutched from the shaft 91, and the lever 116 is immediately actuated to release the presser bar and permit it to resume its normal raised or unclamping condition. This done, the series of wired sticks are drawn rearwardly and beyond the chain a measured distance to provide corresponding lengths of wire between the sticks and the presser bar; whereupon the wires are simultaneously cut at the foot of the presser bar, and the sticks with their attached wires are then removed preparatory to the advancement of a succeeding pair of stick-supplied chain links to the field of the wiring mechanism.

The means shown in the drawings for withdrawing the sticks and their wires from the chain links includes an oscillatory gripper which is effective to grasp the rearwardly projecting ends of the series of sticks, pull them bodily a determined distance, and then release them.

The gripper illustrated embodies two complementary parallel jaw bars 120 and 121 which extend longitudinally of the machine in a position directly rearward of two adjoining chain links situated at the wiring station while the chain is at rest. The base bar 120 is fixedly supported by a pair of spaced substantially radial arms 122 fast on a longitudinal shaft 123 journaled in suitably-disposed hangers 124 depending from the table, which shaft is actuated to oscillate the arms 122 through a vertical arc in timed relation to the travel of the carrier chain, as will presently appear.

The outer bar 121 is hingedly mounted in operative relation to the bar 120 by means, for example, of a rearward rockshaft 125 having its bearings in a series of ears 126 on the bar 120. One end of the shaft 125 is equipped with a pinion 127 with which meshes the teeth of a rack bar 128 slidably mounted in radial guides 129 on the inner face of the adjacent arm 122. A spring 130, encircling the lower portion of the rack bar, bears against a collar 131 on the latter and against the lower guide 129, thus urging the rack radially outward and swinging the hinged gripper bar 121 to clamping relation with the base bar 120.

The rack bar 128 is provided at its upper end with a lateral roll 132 by the periodical actuation of which the bar 128 is radially moved against the action of the spring 130 in a manner to effect the temporary opening of the gripper; that is to say, when the gripper, in its upward and forward arcuate stroke, approaches the carrier chain, the roll 132 of the rack bar rides against the underside of a switch cam 133 fast on a stud 134 which is conveniently journaled in an upstanding supporting plate 135 fixed on the table. A lateral pin 136 on the switch cam extends through a slot 137 in the plate 135 and is connected to the latter by means of a retracting spring 138, which tends to maintain the switch cam normally in raised position with its nose in the path of the roll 128. Hence the cam 133 when the roll impinges thereagainst depresses the roll and the rack bar 128 against the action of the spring 130, thereby effecting the opening of the gripper bar 121.

The co-operative relation of the parts just described is such that when the gripper reaches the limit of its upward and forward stroke the base bar 120 is positioned directly under the rearwardly projecting ends of the series of wired sticks in the carrier, as seen in Fig. 2. At this juncture the roll 132 of the rack escapes the pivoted end of the switch cam, and the rack, perforce, is snapped upward by the expansion of the spring 130, thus instantly closing the upper jaw upon and in gripping relation with the series of stick ends. Thereupon, the presser bar 107 at the opposite or blunt ends of the sticks is raised, as previously described. In the next succeeding back stroke of the gripper the wired sticks grasped thereby are simultaneously pulled from the chain links. The roll 132 in its outward travel rides upon the switch cam, thus depressing the latter and escaping therefrom, which cam then resumes its normal or raised position. When the wires have been drawn by the receding gripped sticks a determined distance beyond the presser bar 107, such wires are simultaneously severed at the foot of the presser bar, as will be presently described, to provide measured tail wires; and as the gripper continues its stroke the sticks and their wires are carried downward thereby to a lower level where they are released by the gripper. That is to say, as the gripper approaches the limit of its downward stroke the roll 132 rides against a cam 139 supported by a suitably-disposed fixture, such as the pedestal 140, (Figs. 2 and 3), which cam forces the roll and its rack bar radially upward, thus opening the gripper bar 121 against the action of the spring 130, and, perforce, releasing the series of wired sticks. In the initial return stroke of the gripper toward the carrier chain, the roll 132 escapes the cam 139 and the gripper bar 121 resumes its closed condition, thus remaining until the roll engages the switch cam 133 preparatory to the gripping and removal of a succeeding series of sticks projecting from the carrier, as previously mentioned.

Any suitable means for operating the gripper supporting arms 122 in timed relation to the travel of the carrier chain may be employed. In the present instance the rock-shaft 123 is provided with a gear 141 in mesh with a sector gear 142 on the rearward arm 143 of a lever which is fulcrumed on a shaft 144 supported by the hangers 145 previously referred to. The forward arm of the lever extends adjacent a face cam 146 fast on the drive shaft 20 and bears a roll 147 which is operatively fitted in the race of the cam. The contour of the cam is such that the arms 122 and the accompanying gripper devices are swung upward and towards the carrier, being positioned adjacent thereto, and the gripper bar 120 closed upon the stick ends, when the carrier comes to rest, and that during the dwell of the carrier the arms 122 and the closed grippers are swung rearward and away from the carrier preparatory to the next succeeding step of the carrier to present another series of sticks to the field of the wiring mechanism.

The shaft 123 carrying the gripper supporting arms 122 is preferably provided with a suitably-disposed weight 148 effective to counterbalance the oscillating arms and their appurtenances.

The forward end of the lower gripper bar 120 is also preferably provided with laterally beveled projections 149 which register with similarly formed notches 150 in the rearward edges of the chain links opposed thereto when the gripper reaches the limit of its upward and forward stroke while the carrier chain is at rest, thus insuring the accurate positioning of the engaged chain links in relation to the winding gears preparatory to the winding operation.

It is to be noted that the center of the shaft 125 upon which the upper gripper bar is pivoted is positioned substantially in vertical alignment with the axis of oscillation of the arms 122, when the gripper is in proximity to the carrier chain. Therefore, in the initial rearward stroke of the gripper the sticks are pulled lengthwise in a substantially horizontal path in a manner to draw the wired ends of the sticks clear from the overhanging presser bar 107 and the attached wires longitudinally of the sticks a determined distance.

At this stage the wire lengths are severed from the bodies of the wires at the foot of the raised presser bar 107. Simple and efficient means for this purpose comprises a vertically reciprocating knife 151 which is guided in vertical alignment with the slots 26 of two adjoining chain links positioned adjacent the winding gears so as to be reciprocable through the slots. The mid-portion of the upper edge of the knife is cut away, as at 152, (Fig. 5) in order to clear the space between the adjacent sticks of two adjoining links, when the chain is at rest, and the table 16, bed 18 and forward guide bar 27 are suitably slotted for the vertical passage and guidance of the knife in its reciprocation.

The knife is carried by a cross-head 153 which is slidably mounted in vertical guides 154 depending from the table, and which cross-head is pivotally connected by means of a link 155 with one arm 156 of a rock lever which is fulcrumed on the shaft 144 previously referred to. The other arm 157 of this lever bears a roll 158 operatively fitted in the race of a face cam 159 fast on the drive shaft 20. The contour of the race is such that when the gripper in its back stroke has carried the sticks and their attached wires a determined distance, the rock-lever is actuated in a manner quickly to raise and lower the cross-head and its knife, which knife in its upward stroke passes freely through the slots in the chain links and simultaneously severs the series of opposed wires which are backed by the overhanging presser bar 107.

Immediately after the wire tie lengths have been severed from the bodies of the wires, the sticks to which such wire lengths are attached are carried down by the gripper and released, as previously described, thence falling into an underlying receptacle 160, or the like.

A curved guard member 161 is conveniently supported by the plate 135 and a spaced corresponding plate on the table 16, which member extends adjacent the path of the swinging gripper supporting arms at the rear of the machine.

It is to be understood that any desired number of winding devices or any desired number of series of winders may be employed the intermittent travel of the chain being varied accordingly. Also, that in other respects the exemplifying constructions herein disclosed, or any of them, may be modified within the fair spirit of the invention and the scope of the appended claims.

I claim—

1. In a machine for attaching wires to sticks, means for supporting a stick, a rotary winding member mounted adjacent one end of the stick and having a guide through which one end of a wire is adapted to project longitudinally of the adjacent end of the stick, means for periodically rotating said member, a presser member movable upon and from the projecting end of the wire at the stick, and means for operating said presser member in timed relation to the rotary member.

2. In a machine for attaching wires to sticks, means for supporting a stick, a rotary winding member mounted adjacent one end of the stick and having a guide through which one end of a wire is adapted to project longitudinally of the adjacent end of the stick, means for periodically rotating said member, a presser member movable upon and from the projecting end of the wire at the stick, means for operating said presser member in timed relation to the rotary member, and means for withdrawing said stick and its attached wire when the wire end is released by the presser member.

3. In a machine for attaching wires to sticks, means for supporting a stick, a rotary winding member mounted adjacent one end of the stick and having a guide through which one end of a wire is adapted to project longitudinally of the adjacent end of the stick, means for periodically rotating said member, a presser member movable upon and from the projecting end of the wire at the stick, means for operating said presser member in timed relation to the rotary member, and means for withdrawing said stick and its attached wire when the wire end over the stick is released by the presser member, said last-named means including a gripper movable toward and from the unwired end of the stick, and devices for closing and opening said gripper at determined intervals during its travel.

4. In a machine for attaching wires to sticks, an intermittently movable carrier having transverse stick holders in spaced parallel relation, means for supplying sticks to the respective holders, and wire winding means succeeding the stick-supplying means and including at least one rotary member having a wire guide through which one end of a wire is adapted to project longitudinally of the adjacent end of a stick when the stick is advanced thereto, and holding means for the projecting end of the wire at the stick during the winding operation.

5. In a machine for attaching wires to sticks, an intermittently movable carrier having transverse stick holders in spaced parallel relation, means for supplying sticks to the respective holders, wire-winding means succeeding the stick-supplying means and including at least one rotary member having a wire guide through which one end of a wire is adapted to project longitudinally of the adjacent end of a stick when the stick is advanced thereto, holding means for the projecting end of the wire at the stick during the winding operation, and means for withdrawing said stick and its attached wire when the said wire end is released.

6. In a machine for attaching wires to sticks, an intermittently movable carrier having transverse stick holders in spaced parallel relation, means for supplying sticks to the respective holders, wire-winding means succeeding the stick-supplying means and including at least one rotary member having a wire guide through which one end of a wire is adapted to project longitudinally of the adjacent end of a stick when the stick is advanced thereto, holding means for the projecting end of the wire at the stick during the winding operation, means for withdrawing said stick and its attached wire when the said wire end is released, and means for severing a determined length of the attached wire from the body of the wire at the holding means.

7. In a machine for attaching tie wires to sticks, the combination of means for winding a wire end about one end of a stick so as to fixedly attach the wire to the stick, a gripper, means operative to move the gripper toward and from the opposite end of the stick, means for closing the gripper upon the latter end of the stick when the gripper is moved toward the stick, and means for opening the gripper in its back stroke.

8. In a machine for attaching tie wires to sticks, the combination of means for winding a wire end about one end of a stick so as to fixedly attach the wire to the stick, a gripper, means operative to move the gripper toward and from the opposite end of the stick, means for closing the gripper upon the latter end of the stick when the gripper is moved toward the stick, means for severing a measured length of the attached wire from the body of the wire during the back stroke of said gripper, and means for opening the gripper after the severance of the wire.

9. In a machine for attaching tie wires to sticks, an intermittently movable carrier having transverse stick holders in spaced parallel relation and also having spaced locking portions along the edge of the carrier, means for tightly winding a wire end about one end of each stick so as to fixedly attach the wire to the stick, and means for withdrawing the stick lengthwise and pulling therewith a trailing portion of the attached wire, said latter means including a gripper for the sticks and a carrier positioning member which successively engages and disengages the opposing locking portion of the carrier.

10. In a machine for attaching tie wires to sticks, an intermittently movable carrier having transverse stick holders in spaced parallel relation and also having spaced locking portions along one edge of the carrier, means for tightly winding a wire end about one end of each stick so as to fixedly attach the wire to the stick, means for withdrawing the stick lengthwise and pulling therewith a trailing portion of the attached wire, said latter means including a gripper for the sticks and a carrier positioning member which successively engages and disengages the opposing locking portion of the carrier, and means for severing a determined length of the attached wire from the body of the wire.

11. In a machine for attaching tie wires to sticks, an intermittently movable carrier having transverse stick holders in spaced parallel relation and also having spaced locking portions along one edge of the carrier, wire winding means including at least one rotary winder having a wire guide through which one end of a wire is adapted to project longitudinally of the adjacent end of a stick when the stick is advanced thereto, holding means for the projecting end of the wire at the stick during the winding operation, means for actuating the winder to wind the projecting end of the wire about the stick to fixedly attach the wire to the stick, means for withdrawing said stick and its attached wire when the said wire end is released by the holding means, and including a carrier positioning member which successively engages and disengages the opposing locking portion of the carrier, and means for severing a determined length of the attached wire from the body of the wire at the holding means during the withdrawal of the wired stick.

12. A process of producing wired floral sticks, consisting in holding at one end of a stick the free end of a strand of wire, in winding a portion of said strand about such stick end so as to fixedly attach the wire to the stick, in releasing the said wire end, in pulling the stick lengthwise to withdraw therewith the attached trailing wire, and in severing a measured trailing length of the attached strand from the body of the strand to provide a tail wire.

13. In a machine for attaching tie wires to sticks, means for feeding and supporting sticks, means for tightly winding a wire end about one end of each stick so as to fixedly attach the wire to the stick, and means for gripping and longitudinally withdrawing the stick and pulling therewith a trailing wire portion of sufficient length for attaching the stick to the article to which it is to be applied.

14. In a machine for attaching tie wires to sticks, means for feeding and supporting sticks, means for tightly winding a wire end about one end of each stick so as to fixedly attach the wire to the stick, means for gripping and longitudinally withdrawing the stick and pulling therewith a trailing wire portion of sufficient length for attaching the stick to the article to which it is to be applied, and means for thereafter severing said length of the trailing wire from the body of the wire.

15. In a machine for attaching tie wires to sticks, the combination with means for winding a wire end about one end of a stick so as to fixedly attach the wire to the stick, of means for gripping and drawing the stick and pulling therewith a sufficient length of the attached trailing wire from the winding means for attaching the stick to the article to which it is to be attached, and means for thereafter severing the measured length of the attached trailing wire from the body of the wire.

16. In a machine for attaching tie wires to sticks, the combination with means for winding wire about one end of a stick so as to fixedly attach the wire to the stick, of means for drawing the stick and pulling therewith from the winding means a trailing wire portion of sufficient length for attaching the stick to the article to which it is to be applied, said winding means comprising a clamp reciprocative toward and from the stick so as to fixedly hold the stick, devices for closing and opening said clamp at determined intervals, and said drawing means comprising grippers for drawing the stick and pulling therewith said trailing portion of the attached wire from the winding means during the opening interval of said clamp.

17. In a machine for attaching tie wires to sticks, the combination of means for holding the free end of a wire at one end of a stick, means for winding a part of the wire about the adjacent end of the stick, mechanism for rendering said holding and winding means relatively active and inactive at timed intervals, and means for gripping and longitudinally withdrawing the stick and pulling therewith a trailing wire portion of sufficient length for attaching the stick to the article to which it is to be applied.

18. In a machine for attaching tie wires to sticks, the combination of means for holding the free end of a wire at one end of a stick, means for winding a part of the wire about the adjacent end of the stick so as to fixedly attach the wire to the stick, mechanism for rendering said holding and winding means relatively active and inactive at timed intervals, said mechanism including a cam and operative connections between said cam and the holding and winding means, and means for gripping and longitudinally withdrawing the stick and pulling therewith a trailing wire portion of sufficient length for attaching the stick to the article to which it is to be applied.

JOHN R. NOLAN.